United States Patent
Yamamoto

[15] 3,654,600
[45] Apr. 4, 1972

[54] STEERING LOCKING DEVICE

[72] Inventor: Yukio Yamamoto, Ohmiya, Japan

[73] Assignees: Nissan Motor Company, Limited, Yokahama; Kanto Seiki Company, Limited, Nissin-cho, Ohmiya, Japan

[22] Filed: Dec. 21, 1970

[21] Appl. No.: 99,958

[30] Foreign Application Priority Data

Dec. 29, 1969 Japan..................44/105176

[52] U.S. Cl. .................340/52 D, 70/252, 70/441, 200/61.59, 200/61.66
[51] Int. Cl. ..................................B60r 25/02
[58] Field of Search ..........70/252, 441; 340/52 R, 52 D, 340/63, 64; 200/44, 61.59, 61.66

[56] References Cited

UNITED STATES PATENTS

| 2,063,088 | 12/1936 | Fitzgerald | 70/252 |
| 2,261,868 | 11/1941 | Arriaza | 200/61.66 |
| 2,613,258 | 10/1952 | Azano | 340/52 D |
| 3,520,161 | 7/1970 | Jacobi | 70/441 X |
| 3,566,635 | 3/1971 | Wolter | 70/252 |
| 3,569,930 | 3/1971 | Hirama | 70/252 |

FOREIGN PATENTS OR APPLICATIONS

| 1,800,885 | 4/1970 | Germany | 70/252 |

*Primary Examiner*—Albert G. Craig, Jr.
*Attorney*—John Lezdey

[57] ABSTRACT

A steering locking device for an automotive steering system, whereby the steering shaft is locked when the key cylinder is held in its "lock" position and when the key is removed from the key cylinder and whereby a warning signal such as sound or light is produced when the vehicle door is opened with the steering shaft left unlocked and/or the key left inserted into the key cylinder. The warning signal is produced through operation of an electric switch mechanism which is compactly accommodated in the housing of the locking device.

7 Claims, 6 Drawing Figures

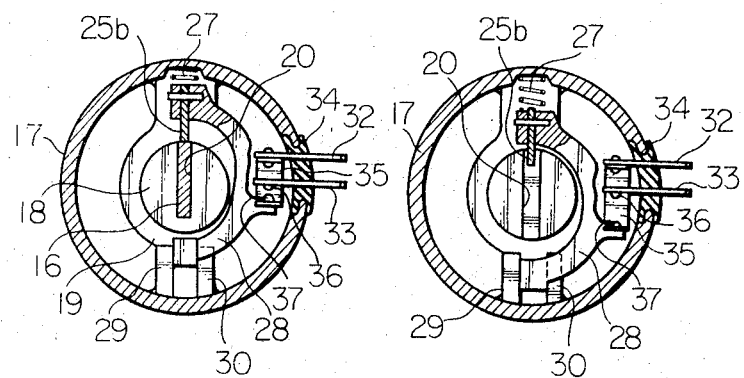
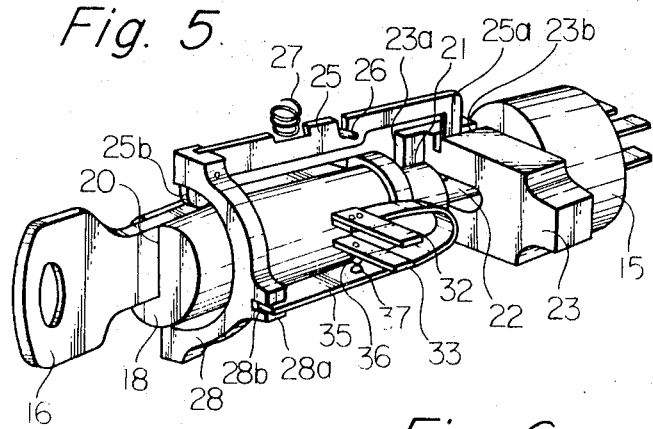
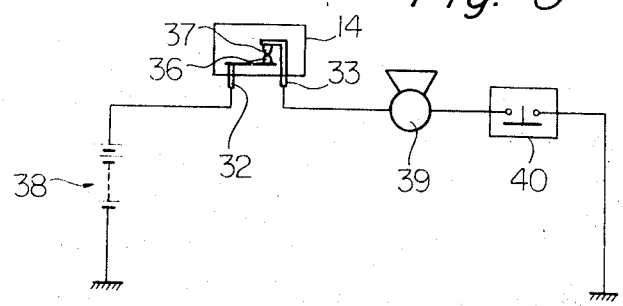

STEERING LOCKING DEVICE

This invention relates to a steering system of a motor vehicle and, more particularly, to a device for locking a steering shaft of the steering system.

The steering locking device according to the invention is largely made up of means responsive to the conditions of a key cylinder, means responsive to the condition of the vehicle door and means producing warning signals such as sound or light. The means responsive to the condition of the key cylinder includes an electrical arrangement which is held operative when the key is kept inserted into the key cylinder irrespective of the relative position of the key cylinder. The means responsive to the condition of the vehicle door includes an electric switch which is closed only when the vehicle door is open. The warning means becomes operative when both of the former two means are operative. The steering locking device implementing this invention thus operates to hold the steering shaft in a locked position as long as the key cylinder is in its "lock" position and the key is removed from the key cylinder in this condition and to have the warning means actuated when the driver opens the door with the key cylinder held in a position other than the "lock" position and/or the key kept inserted into the key cylinder. The steering locking device is therefore adapted to warn the driver that the steering shaft is kept unlocked and/or the key kept inserted into the key cylinder when he is leaving and that the door is kept open with the key cylinder rotated to its "start" position when the driver is starting the vehicle.

A wide variety of steering locking devices for motor vehicle have heretofore been proposed and put into practice, including an arrangement in which a switch which is responsive to the position of the locking member relative to the steering shaft and a switch which is responsive to the movement of the vehicle door are connected in series with each other. Unless the locking member has been moved to a position to lock the steering shaft when the driver is leaving the vehicle, the switches are closed to produce a warning signal such as sound or light as soon as the door is opened by the driver whereby the driver is informed that the steering shaft is left unlocked. A drawback is encountered in this type of the prior art locking arrangement in that the warning signal is not produced if the key is kept inserted into the key cylinder which has been moved to its "lock" position. If, moreover, the locking member of such locking arrangement fails to properly engage with an engaging part of the steering shaft although the locking member is moved to a position to lock the steering shaft, the switch associated with the locking member will happen to remain closed, producing unnecessary warning signal which may irritate the driver.

An improvement has therefore been made on this type of the locking arrangement, in which electric switch mechanism actuated by the upward or downward movement of the tumbler is incorporated in the key cylinder. The electric switch mechanism is kept closed unless the cylinder is moved to its "lock" position and unless the key is removed from the key cylinder. Incorporation of the electric switch mechanism within an extremely limited space in the key cylinder is, however, reflected by degraded durability and reliability of the electric switch mechanism.

Another prior art steering locking device uses a lever which is pivotally connected to the housing of the locking device and which is engageable at its forward end with a groove formed in the locking member and at its rearward end with a groove formed in the key cylinder. When the key is removed from the key cylinder which is held in its "lock" position, then the rearward end portion of the lever is admitted into the groove in the key cylinder so that the lever is rotated pivotally. This causes the forward end portion of the lever to be released from the groove in the locking member, which consequently is permitted to protrude into a position to lock the steering shaft. An electric switch mechanism is positioned over this lever arrangement and is controlled by the pivotal movement of the lever. Foremost of the difficulties encountered in this type of the steering locking device is, invariably, the extremely limited space in which the electric switch mechanism can be accommodated without impairing the switching motions thereof.

An object of this invention is therefore to provide a steering locking device which is capable of producing a warning signal if the steering shaft is left unlocked and/or if the key is left inserted into the key cylinder when the vehicle driver is leaving the vehicle.

Another object is to provide a steering locking device featuring a compact and economical construction and a reliable performance.

Still another object is to provide a steering locking device in which an electric switch mechanism is accommodated compactly within an ample space in the housing of the device without restriction to the operations of the switch mechanism. This object is accomplished by this invention through effective utilization of the space in the housing which has not been fully utilized in the locking device of the described type.

In the drawings:

FIGS. 3 and 4 are sections on line III—III of FIG. 2, the sections showing different positions of the locking device;

FIG. 5 is a perspective view showing working elements of the locking device; and FIG. 6 is a view showing an electric circuit forming part of the steering locking device according to this invention.

Figure 1:
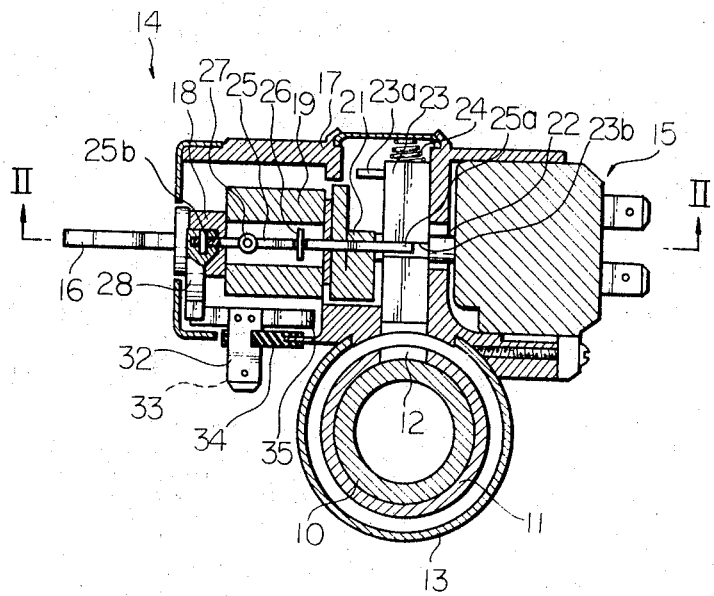
FIG. 1 is a sectional view showing an embodiment of a steering locking device according to this invention.

As best seen in FIG. 1, the steering locking device according to this invention is used on a steering shaft 10 of a motor vehicle. The steering shaft 10, which is connected to a steering wheel (not shown) as customary, is secured to a collar 11 having an axially extending groove 12 for engagement with a locking member of the device according to this invention as will be described later. The collar 11 is tightly encased in a jacket tube 13.

A steering locking device impelementing this invention is held in place relative to the steering shaft thus constructed. The steering locking device, generally designated by reference numeral 14, is interlocked with an ignition switch 15 and is operated by turning a key 16. The locking device 14 includes a bored, generally cylindrical housing 17 through which the locking device is mounted on the jacket tube 13 of the steering shaft 10.

The housing 17 has accommodated in its bore a key cylinder which is made up of an inner cylindrical member 18 and an outer cylindrical member 19 as best seen in FIG. 1 or FIGS. 3 and 4. The inner cylindrical member 18 has formed therein a groove 20 which extends lengthwise of the cylindrical member. The groove 20 is adapted to receive the key 16 therein so that, when the key 16 is inserted into the groove 20 and rotated in either direction, the inner cylindrical member 18 is rotated accordingly relative to the housing 17. The depth of the axial groove 20 is substantially equal to the overall width of the locking part of the key 16 so that, when the key is inserted into the groove 20, the outer edge of the key becomes substantially flush with the outer peripheral wall surface of the inner cylindrical member 18. A semi-circular cam 21 is secured internally to the leading end of the inner cylindrical member 18, which cam is rotatable with the cylindrical member 18. A spindle 22 extends from the cam 21 for operative engagement with the ignition switch 15.

A locking member 23 is positioned behind the cam 21 and relative to the steering shaft 10. The locking member 23 is movable toward and away from the steering shaft 10 for engagement with the axial groove 12 formed in the collar 11. A compression spring 24 is seated on that side of the locking member 23 which is opposite to the steering shaft 10, whereby the locking member 23 is at all times biased toward the steering shaft 10. The locking member 23 is provided with an abutment 23a which extends toward the leading end of the inner cylindrical member 18 and which is positioned relative to and engageable with the semi-circular cam 21. The locking member 23 has formed in its upper wall a groove 23b extending in an axial direction of the housing 17 for the reason to be discussed later. The locking member 23 has formed therein an elongated slot 23c through which the spindle 22 extends toward the ignition switch 15 as seen in FIG. 5.

A lever 25 is provided which extends in parallel with the inner cylindrical member 18 and which is pivotally movable about a pivot or pin 26. The pivot or pin 26 is in pivotal engagement with the lever 25 at a substantially central portion of the lever and is held stationary relative to the housing 17. The lever 25 has formed at its forward end a portion 25a which is bent toward the locking member 23 so as to be engageable with the groove 23b formed in its upper wall. The lever 25 also has formed at its end opposite to the bent portion 25a a portion 25b which is rounded toward the outer peripheral wall of the inner cylindrical member 18 so as to be engageable with the axial groove 20. The inner cylindrical member 18 is positioned relative to the lever 25 in such a manner that, when the cylindrical member 18 is rotated by the key 16 to a "lock" position, then the axial groove 20 and accordingly the top edge of the key 16 are brought into alignment with the lever 25 or, more specifically, with the rounded portion 25b of the lever 25. A compression spring 27 is seated on the outer edge of the lever 25 between the pivot or pin 26 and the rounded portion 25b. The compression spring 27 may be secured to the inner peripheral wall of the housing 17 as seen in FIGS. 3 and 4.

The lever 25 is mechanically and operatively connected to an electric switch mechanism of the locking device 14 through a connecting member 28. The connecting member 28 is rigidly connected at one end thereof to the rounded portion 25b of the lever 25 and is slidably received at the other end by suitable guiding means which may comprise guide members 29, 30 and 31 secured to the inner peripheral wall of the housing 17 as seen in FIGS. 3 and 4. This guiding means is so constructed and arranged as to permit the connecting member 28 to move toward and away from the inner cylindrical member 18. The connecting member 28 is generally arcuately curved in its entirety so as not to be brought in contact with the inner cylindrical member 18 when it is moved relative thereto. The connecting member 28 may be shaped otherwise such as in a ring form insofar as it is at all times mechanically isolated from the cylindrical member 18.

The connecting member 28 has formed at its substantially central portion an outward extension 28a in which a slot 28b is formed as seen in FIG. 5.

Figure 2:
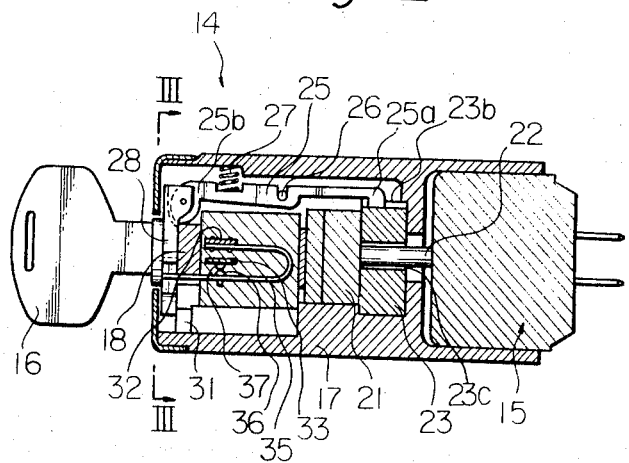
FIG. 2 is a section on line II—II of FIG. 1.

An electric switch mechanism of the locking device according to this invention includes a pair of spaced parallel terminal plates 32 and 33. The terminal plates 32 and 33 are secured to the housing 17 through a suitable electrically insulating member 34 and are directed at their leading ends toward the inner cylindrical member 18 of the key cylinder. A generally U-shaped, resilient member 35 is rigidly connected at one end thereof to the terminal plate 32 and is seized at the other end in the slot 28b formed in the extension 28a of the connecting member 28. The straight portions of this U-shaped resilient member 35 is substantially parallel to the axial direction of the housing 17. The terminal plate 33 is thus positioned between the opposite terminal plate 32 and that portion of the U-shaped resilient member 35 which extends to the extension 28a of the connecting member 28 as seen in FIGS. 2 and 5. A pair of mutually facing electric contacts 36 and 37 are mounted on the facing sides of the terminal plate 33 and the U-shaped resilient member 35, respectively.

Referring to FIG. 6, the terminal plates 32 and 33 are connected in series with a source 38, suitable warning means 39 and a switch 40 which is responsive to the movement of a door (not shown) of the vehicle body. The warning means 39 may be a buzzar or a light. The switch 40 operates in response to the movement of the vehicle door and is closed only when the door is open.

When, in operation, the key 16 inserted into the axial groove 20 of the inner cylindrical member 18 is turned to rotate the member 18 to a position other than the "lock" position so as to enable the vehicle to start, then the rounded portion 25b of the lever 25 is forced against the outer peripheral wall of the inner cylindrical member 25 by the action of the compression spring 26. The semi-circular cam 21 which is integral with the inner cylindrical member 18 is concurrently rotated to abut against the abutment 23a of the locking member 23 and moves the locking member 23 until the groove 23b formed therein is in alignment with the bent portion 25a of the lever 25. Since, at this instance, the bent portion 25a is urged downward with the opposite end portion 25b resting on the outer peripheral wall of the inner cylindrical member 18, the portion 25a is brought into engagement with the groove 23b. The locking member 23 is in this manner held in its retracted position, permitting the steering shaft 10 to rotate freely together with the collar 11. It is, in this instance, to be noted that, because the rounded portion 25b of the lever 25 is held to rest on the outer peripheral wall of the inner cylindrical member 18, the connecting member 28 which is secured to the rounded portion 25b is held in its raised position, whereby the electric contact 37 mounted on the resilient member 35 is forced against the opposite electric contact 36 mounted on the terminal plate 33. The terminal plates 32 and 33 are thus electrically connected to each other. If, therefore, the vehicle door is opened under these conditions, then the electric circuit shown in FIG. 6 is closed and the warning means 39 becomes operative to inform the driver that the door is open.

When, now, the key 16 is rotated to rotate the inner cylindrical member 18 to the "lock" position as illustrated in FIGS. 1, 2, 3 and 5, then the rounded portion 25b of the lever 25 is caused to rest on the outer edge of the key 16 and concurrently the semi-circular cam 21 is rotated and disengaged from the abutment 23a of the locking member 23 which is consequently held in its retracted position solely by the bent portion 25a of the lever 25. Since, in this instance, the outer edge of the key 16 is substantially flush with the outer peripheral wall of the inner cylindrical member 18, the lever 25, connecting member 28 and U-shaped resilient member 35 all assume the relative positions which are similar to those assumed when the rounded portion 25b of the lever 25 rests upon the peripheral wall of the cylindrical member 18 as previously discussed. The terminal plates 32 and 33 are invariably electrically connected to each other. If, therefore, the driver is leaving the vehicle under these conditions, then the electric circuit of FIG. 6 is closed and the warning means operates to inform the driver that the steering shaft 10 is left unlocked with the steering locking device 14 held in its locking position.

When the key 16 is removed from the inner cylindrical member 18 held in its "lock" position, then the rounded portion 25b of the lever 25 is admitted into the axial groove 20 by the action of the compression spring 27, whereby the lever 25 is rotated about the pivot or pin 26 counterclockwise FIG. 2 and whereby the connecting member 28 is moved downward together with the rounded portion 25b of the lever 25. The lever 25 being thus rotated about the pivot or pin 26, the bent portion 25a of the lever is released from the groove 23b of the locking member 23, which consequently is caused by the action of the compression spring 24 to protrude forward and engages with the groove 12 in the collar 11 of the steering shaft 10. The steering shaft 10 is locked by the leading end portion of the locking member 23 and is thus prevented from being rotated. With the connecting member 28 moved downward together with the rounded portion 25b of the lever 25, on the other hand, the resilient member 35 connected to the terminal plate 32 is accordingly moved downward, so that the electric contact 37 mounted thereon is disengaged from the opposite electric contact 36 mounted on the terminal plate 33. The terminal plates 32 and 33 are thus electrically disconnected from each other so that, even when the door is opened, the circuit shown in FIG. 6 remains open and the warning means 39 is held inoperative.

If, now, the driver has once removed the key from the inner cylindrical member 18, inserted it for a second time to move the cylindrical member to its "lock" position and failed to remove the key when leaving the vehicle, the terminal plates 32 and 33 are kept electrically connected to each other as previously discussed so that the warning signal is produced from the warning means 39 as soon as the vehicle door is opened by him.

According to one outstanding feature of the device implementing this invention, the electric switch mechanism is operated by the insertion into and removal from the key cylinder. Thus, no warning signal is produced unless the key cylinder is held in its "lock" position and unless the key is removed from the key cylinder in this position. In other wards, the warning signal is produced when the driver is leaving the vehicle not only if the steering shaft is left unlocked but also if the key is kept inserted into the key cylinder with the steering shaft already locked.

According to another outstanding feature of the device of this invention, the electric switch mechanism which plays a vital role for the operation of such device is compactly and reasonably accommodated within an ample space in the housing of the device. This feature can be traced to the fact that the movement of the lever 25 is carried over to the electric switch mechanism through the movable connecting member 28 and the U-shaped resilient member 35. Since, in this instance, the U-shaped resilient member 35 is positioned sidewise of and at a sufficient spacing from the key cylinder, the moving contact 36 mounted thereon can be moved without mechanical restriction or interference imposed thereon. Since, moreover, the length of the resilient member 35 can be selected as desired, the member 35 can be made of a material having a relatively low spring constant. The switch mechanism using such resilient member 35 is thus significantly saved from being fatigued early in use.

What is claimed is:

1. A steering locking device for an automotive steering system having a steering shaft having formed therein an axial groove for locking engagement with said device, which device comprises a key cylinder having formed therein a lengthwise groove to receive therein a key for rotating said key cylinder, a semi-circular cam secured to the leading end of said key cylinder, a locking member positioned adjacent said cam and movable into and out of said axial groove in said steering shaft, spring means biasing said locking member toward said steering shaft, said locking member including an abutment extending toward said key cylinder and a groove formed in said locking member, said cam being in engagement with said abutment for moving said locking member against the action of said spring means to a position retracted from said axial groove in said steering shaft when said key cylinder is held in a position other than a "lock" position, a lever positioned substantially in parallel to said key cylinder and movable about a pivot positioned substantially centrally thereof, said lever having at its forward end a bent portion directed toward said locking member and positioned in alignment with said groove in said locking member when the locking member is held in its retracted position by said cam and at its rearward end a rounded portion directed toward said key cylinder and engageable with said lengthwise groove in the key cylinder, spring means biasing said rounded portion toward said key cylinder, said rounded portion being forced by the action of the last named spring means against the outer peripheral wall of said key cylinder when the key cylinder is held in a position other than its "lock" position and against an outer edge of said key when said key cylinder is held in its "lock" position and when said key is left inserted into said lengthwise groove in the key cylinder, an electric switch mechanism positioned relative to said key cylinder, a connecting member mechanically connected at one end to said rounded portion and at the other to said switch mechanism for carrying a mechanical displacement of said lever to said switch mechanism, said switch mechanism being kept closed when said rounded portion is forced against said outer peripheral wall of said key cylinder or said outer edge of said key inserted into said lengthwise groove, said rounded portion being admitted into said lengthwise groove when said key is removed from said cylinder held in its "lock" position for causing said bent portion to be released from said groove in said locking member to permit the locking member to protrude into said axial groove in said steering shaft by the action of the first named spring means and for causing said connecting member to be moved to a position in which said switch mechanism is opened, and warning means electrically connected to said switch mechanism for producing a warning signal when said switch mechanism is closed.

2. A steering locking device according to claim 1, further comprising switch means connected in series with said switch mechanism and said warning means and responsive to an opening movement of a vehicle door, said switch means being closed when said vehicle door is open, whereby said warning means produces said warning signal when both said switch mechanism and said switch means are closed.

3. A steering locking device according to claim 1, wherein said electric switch mechanism includes first and second terminal plates which are facing each other, a generally U-shaped resilient member mechanically connected at one end to said first terminal plate and at the other to said connecting member, first and second electric contacts mounted respectively on said resilient member and said second terminal plate and electrically connected to said warning means, said first electric contact being held in contact with said second electric contact when said rounded portion is forced against said outer edge of said key inserted into the key cylinder and being disconnected therefrom when said rounded portion is admitted into said lengthwise groove in the key cylinder.

4. A steering locking device according to claim 1, wherein said lengthwise groove in said key cylinder has a depth which is substantially equal to the width of said key whereby said outer edge of the key inserted into said lengthwise groove is substantially flush with said outer peripheral wall of said key cylinder.

5. A steering locking device according to claim 1, wherein said connecting member is generally arcuately curved in its entirety.

6. A steering locking device according to claim 5, wherein said connecting member has formed at its substantially central portion an outward extension in which a slot is formed to receive a connecting end of said switch mechanism.

7. A steering locking device for an automotive steering system having a steering shaft having formed therein an axial groove for locking engagement with said device, which device comprises a key cylinder having formed therein a lengthwise groove to receive therein a key for rotating said key cylinder, a semi-circular cam secured to the leading end of said key cylinder, a locking member positioned adjacent said cam and movable into and out of said axial groove in said steering shaft, spring means biasing said locking member toward said steering shaft, said locking member including an abutment extending toward said key cylinder and a groove formed in said locking member, said cam being in engagement with said abutment for moving said locking member against the action of said spring means to a position retracted from said axial groove in said steering shaft when said key cylinder is held in a position other than a "lock" position, a lever positioned substantially in parallel to said key cylinder and movable about a pivot positioned substantially centrally thereof, said lever having at its forward end a bent portion directed toward said locking member and positioned in alignment with said groove in said locking member when the locking member is held in its retracted position by said cam and at its rearward end a rounded portion directed toward said key cylinder and engageable with said lengthwise groove in the key cylinder, spring means biasing said rounded portion toward said key cylinder, said rounded portion being forced by the action of the last named spring means against the outer peripheral wall of said key cylinder when the key cylinder is held in a position other than its "locks" position and against an outer edge of said key when said key cylinder is held in its "lock" position and when said key is left inserted into said lengthwise groove in the key cylinder, an electric switch mechanism positioned relative to said key cylinder, a connecting member mechanically connected at one end to said rounded portion and at the other to said switch mechanism for carrying a mechanical displacement of said lever to said switch mechanism, said switch mechanism being kept closed when said rounded portion is forced against said outer peripheral wall of said key cylinder or said outer edge of said key inserted into said lengthwise groove, said rounded portion being admitted into said lengthwise groove when said key is removed from said cylinder held in its "lock" position for causing said bent portion to be released from said groove in said locking member to permit the locking member to protrude into said axial groove in said steering shaft by the action of the first named spring means and for causing said connecting member to be moved to a position in which said switch mechanism is opened, switch means responsive to an opening movement of a vehicle door, said switch means being closed when said vehicle door is open, and warning means electrically connected to said switch mechanism and said switch means for producing a warning signal when both said switch mechanism and said switch means are closed.

* * * * *